(12) United States Patent
Ramm et al.

(10) Patent No.: US 6,345,115 B1
(45) Date of Patent: Feb. 5, 2002

(54) DIGITAL IMAGING SYSTEM FOR ASSAYS IN WELL PLATES, GELS AND BLOTS

(75) Inventors: Peter Ramm; Gang Sun, both of St. Catharines (CA)

(73) Assignee: Imaging Research, Inc., St. Catharines (CA)

(*) Notice: Subject to any disclaimer, the term of this patent is extended or adjusted under 35 U.S.C. 154(b) by 0 days.

(21) Appl. No.: 09/477,444

(22) Filed: Jan. 4, 2000

Related U.S. Application Data

(63) Continuation of application No. PCT/CA98/00762, filed on Aug. 7, 1998
(60) Provisional application No. 60/054,892, filed on Aug. 7, 1997.

(51) Int. Cl.⁷ ................................................ G06K 9/00
(52) U.S. Cl. ..................... 382/133; 382/133; 382/128; 377/10
(58) Field of Search ................................ 382/133, 128; 435/6, 287; 250/306, 366; 422/68; 377/10

(56) References Cited

U.S. PATENT DOCUMENTS

| | | | | |
|---|---|---|---|---|
| 5,061,850 A | * | 10/1991 | Kelly et al. | 250/306 |
| 5,627,908 A | * | 5/1997 | Lee et al. | 382/133 |
| 5,770,850 A | * | 6/1998 | Bowen et al. | 250/203 |
| 5,866,907 A | * | 2/1999 | Drukier et al. | 250/366 |
| 5,961,923 A | * | 10/1999 | Nova et al. | 422/68 |
| 6,057,163 A | * | 5/2000 | McMillan | 436/172 |
| 5,972,693 A | * | 8/2000 | Rothberg et al. | 435/287 |
| 6,100,026 A | * | 8/2000 | Nova et al. | 435/6 |
| 6,103,083 A | * | 8/2000 | Merenkova et al. | 204/603 |
| 6,252,714 B1 | * | 6/2001 | Guenther et al. | 359/559 |

* cited by examiner

Primary Examiner—Leo Boudreau
Assistant Examiner—M B Choobin
(74) Attorney, Agent, or Firm—Darby & Darby

(57) ABSTRACT

A method and apparatus are disclosed for use in an area digital imaging system for assays to extract targets on a specimen containing an array of targets that may not be arranged in perfect regularity. A matrix is defined of nominal target locations including a probe template of predefined, two-dimensional size and shape at each of a plurality of fixed, predefined grid points on the specimen, and a determination is made of the most probable location of the probe template corresponding to a specific target by sensing both pixel intensity and the spatial distribution of pixel intensities in an image of the specimen at a plurality of locations in the vicinity of a nominal target location.

20 Claims, 10 Drawing Sheets

DIGITAL IMAGING SYSTEM FOR ASSAYS IN WELL PLATES, GELS AND BLOTS

This patent application claims the priority of Provisional Patent Application 60/054,892 filed Aug. 7, 1997.

This is a continuation of international application Serial No. PCT/CA98/00762, filed Aug. 7, 1998, the entire text of which is incorporated herein by reference.

FIELD OF THE INVENTION

The present invention relates to a system for creating digital images of fluorescent, luminescent, or bright field specimens. The system is flexible, both in its mode of illumination and in that specimens may be arrayed in matrices (e.g. well plates) or randomly arranged (e.g. chemiluminescent colonies, gel media).

BACKGROUND OF THE INVENTION

The present invention is primarily an assay imaging system. An assay may be defined as a measurement of physical properties (chemical, biochemical, physiological or other) within a specimen. Assays are used, typically, in the areas of molecular biology, genomics, and pharmaceutics.

The standard assay specimen container is a plastic or glass plate containing 96 small chambers, termed wells. Detection instruments and robotic plate handling technologies have evolved to make efficient use of the 96 well plate, and to provide as high a throughput as possible with this plate format. Current screening technologies can allow a large screening laboratory using 96 well plates to process some thousands of compounds per day.

Recently, there has been a massive growth in the number of compounds available for testing. In part, this is due to an increased exploitation of biodiversity resources to generate natural compounds. In greater part, the proliferation of new compounds is a result of a new chemical technology, termed combinatorial chemistry. In combinatorial chemistry, large numbers of related compounds are synthesized (using permutations of chemical building blocks), and must then be tested for medicinal value.

With new discoveries in natural compounds, and with the advent of combinatorial chemistry, pharmaceutical companies and biotechnology companies are generating extensive "libraries" of untested compounds. These libraries can easily contain millions of compounds. Standard measurement technologies cannot cope with the volume, and new technologies are needed which will increase the rate at which compounds can undergo initial testing (screening) for medicinal value. To show a major advantage over standard technologies, new technologies should allow throughput to exceed 100,000 compounds/instrument per day. Imaging technologies have the promise to increase throughput to the required levels. They have the additional advantage of flexibility, in that an imaging system can be applied to assays in wells and other formats, and to assays which are static or which change over time.

Most assays are designed so that changes in the absorbance, transmission, or emission of light reflect reactions within the specimen. Therefore, most assay measurement instruments detect alterations in luminance as their operating principle. For detection instruments, bioluminescence or chemiluminescence provides the simplest type of assay, in that there is no need to apply illumination. Absorbance assays involve transilluminating the specimen, usually with monochromatic light. The reaction of interest affects the extent to which the light is absorbed by a fluid, and this absorbance may be measured.

Fluorescence is emitted when a fluorophore interacts with an incident photon (excitation). Absorption of the photon causes an electron in the fluorophore to rise from its ground state to a higher energy level. Then, the electron reverts to its original level, releasing a photon (fluorescence emission) hose wavelength depends upon the amount of energy that is released during reversion. A given fluorophore may emit at single or multiple wavelengths (creating an emission spectrum), as electrons drop from various orbitals to their ground states. The emission spectrum is constant for each species of fluorophore.

Fluorescence assays require the application of an intense monochromatic illumination beam, termed "excitation". Fluorescence assays are used for the following types of applications:

1. An detector tuned to a specific emission spectrum can be used to localize a fluorophore. For example, wells which contain cells expressing a fluorescently tagged protein can be discriminated from wells which do not.

2. By measuring the intensity of fluorescence, an detector system can estimate the concentration of a fluorescent molecule.

3. Changes in the fluorophore molecule (such as binding of fura-2 to Ca++) will lead to alterations in the emission spectrum. A detector can be used to measure these spectral changes, as an indication of changes in the environment of the fluorophore.

Wells

Each well contains a discrete condition of the experiment, and alterations in light emission are measured to determine whether that condition yields favorable properties. "Well plate" assays are higher in throughput and lower in cost than similar assays in discrete containers.

Reactions within the wells may be of many kinds. In chemistry assays, molecules of different compounds (e.g. a drug candidate and a receptor molecule) are placed into the same well, and the interaction between those compounds is observed. In cell-based assays, each well contains a population of living cells, and effects of compounds on these cells are observed.

Most assays are conducted by making a single measurement from each well. However, it is also possible to record changes over time, by measuring each well repeatedly. The use of repeated observations could be termed a "dynamic" assay.

Standard well plates contain 96 or 384 wells in an area of about 8×12 cm. The trend is towards miniaturization of the wells. Prototypes containing 864 wells or more are under evaluation at many sites. The goal is to develop plates with high density arrays of small "microwells" (e.g. thousands/plate) with small fill volumes. That is, miniaturized wells might contain 1 ul of fluid instead of the 100 ul or more used in a typical 96 or 384 well assay.

Miniaturized assay formats promise to achieve dramatic cost reductions and to simplify disposal procedures, while allowing many more assays to be conducted.

Hybridization Arrays and Genetic Assays

Low throughput methods of genetic analysis use various electrophoretic procedures. Methods for increasing throughput and decreasing costs of genomic assays include arraying DNA clones (cDNAs) or synthetic oligonucleotides onto flat support membranes or slips of treated glass. The arrays of cDNAs or oligonucleotides (termed high density grids) are then hybridized to samples of genomic material to quantify levels of gene expression, or to localize relevant sequences. In the past, most hybridization assays have been conducted using isotopic label and storage phosphor imaging systems for detection. However, nonisotopic methods (particularly fluorescence) are under investigation in many laboratories.

Nonisotopic high density grids provide the potential for very high throughput at low cost, and various detection technologies are being developed for these specimens.

Free Format Assays

Assays which occur within a regularly spaced array (wells, cDNAs within a grid) can be referred to as fixed format assays. Specimens that are irregularly distributed can be termed free format assays. Examples of free format assays include electrophoregrams, bacterial colonies in culture, and various combinatorial assays in which bead-bound compounds are distributed over a tissue culture. The common factor in these free format assays is that areas of altered luminance can occur at any spatial location.

Instruments designed for fixed format assays (fluorescence plate readers, liquid scintillation counters, etc.) only read from defined locations in the specimen. They are not useful with specimens in which effects lie at locations that are not predefined. In contrast, imaging systems are able to detect and quantify reactions at any position within an image, and there is an extensive history of image analysis being applied to free format assays.

Summary of Types of Assays

Pharmaceutical companies are faced with unprecedented numbers of new compounds, which must be screened for medicinal value. Specimens are screened using luminescence, absorbance, or fluorescence technologies. Specimen formats include standard and miniaturized well plates, high density arrays of hybridization assays, and free format assays. The present invention is designed to be useful for all of these technologies and specimen formats.

Area Imaging Systems

An area imaging system places the entire specimen onto a detector plane at one time. There is no need to move PMTs or to scan a laser, because the camera images the entire specimen onto many small detector elements (usually CCDs), in parallel. The parallel acquisition phase is followed by a reading out of the entire image from the detector. Readout is a serial process, but is relatively fast, with rates ranging from thousands to millions of pixels/second.

Area imaging systems offer some very attractive potential advantages:

1. Because the entire specimen is imaged at once, the detection process can be very quick.

2. It is relatively easy to acquire a timed series of images for dynamic assays.

3. Given an appropriate illumination system, any excitation wavelength can be applied.

4. Luminescence reactions (bioluminescence, chemiluminescence) can be imaged.

5. Free or fixed format specimens can be imaged.

In many applications (e.g. film autoradiography), area imaging has a history, instrument developers have experience, and the problems are well understood. In contrast, assay imaging presents new and significant technical challenges. There is no established practice for imaging assays, and very few instrument developers have practical experience with both area imaging and assay technologies.

Luminescence Area Imaging

We will define luminescence as light emitted from a specimen, without excitation by external light. Most luminescence reactions are quite dim, and this can make extreme demands upon detection. The standard area imaging strategy is to use scientific grade CCD cameras, which achieve relatively high levels of sensitivity. Intensified CCD cameras have also been used.

Typical prior art applies area imaging to luminescent assays on flat membranes. Descriptions of well imaging are flawed in that no correction for parallax error is described. Telecentric lenses have not been used, because prior art telecentric lenses have not been able to collect enough light.

Prior art also fails to disclose the use of software that would allow automated analysis of targets which do not lie in a perfectly regular array, or software which models variations in measurement efficiency from well to well.

The novel features of the present invention (efficient light collection combined with freedom from parallax, target detection software, calibration software which minimizes variations in measurement efficiency) allow it to be used with luminescent specimens that lie beyond the capabilities of prior art luminescence imaging systems.

Fluorescence Area Imaging

Area imaging is in routine use for fluorescence microscopy, where epifluorescence is the universal method and is easily applied. On a microscope, epifluorescence is implemented via an arrangement incorporating a dichroic mirror and interference filters. Prior art in fluorescence microscopy is irrelevant to the present invention, which is specifically designed for macro specimens.

Macro-level, area fluorescence imaging is routinely applied with gels and blots. Although some specialized research systems have been reported, prior art is dominated by low cost commercial systems for routine gel/blot fluorescence. Typically, this type of imaging has been compromised by sub-optimal delivery of excitation illumination. The most common form of area illumination uses gas discharge illuminators (e.g. UV light boxes). The lamps are coated with a filter that limits emission to the peaks emitted by the excited gas within the lamp. Thus, most prior art systems offer a limited number of excitation wavelengths.

Many prior art systems, as those using transilluminators, pass excitation directly through the specimen and into the collection optics. For the highest sensitivity, however, it is important that excitation not be delivered directly into the detection optics. With direct delivery, both the excitation and the emission wavelength are detected, with the excitation at much higher levels than the emission. The excitation wavelength can be filtered, selectively, but enough excitation remains to degrade sensitivity.

To avoid the direct detection of excitation, some prior art systems deliver excitation from above, from the side, via dark field, or using refraction (e.g. evanescent wave) into the specimen. In these cases, the detection optics view fluorescence emission from the specimen, with minimal detection of excitation. However, these techniques have severe limitations. Side-mounted fiber optic illuminators deliver uneven light, and can only be used with flat specimens. When they are used with wells, light enters the specimen at an angle and fails to penetrate deeper regions. Similarly, refractive or dark field illuminators do not penetrate into deep wells, cannot be used with opaque specimens, and tend to provide rather dim levels of illumination.

We can summarize the characteristics of prior art systems as follows:

1. Most are limited to the wavelengths emitted by gas discharge lamps. Typically some combination of UVA, UVB, UVC, and/or white light lamps is provided. Other wavelengths cannot be obtained, and this is a sever disadvantage.

2. Wavelengths cannot be altered during an assay. If the illumination must be changed during the assay (e.g. as for calcium measurement with fura-2), the devices cannot be adapted.

3. Insensitive to small alterations in fluorescence. Transillumination comes from directly below the specimen into the detector optics. Therefore, even very good filters fail to remove all of the incident illumination, and this creates a high background of nonspecific illumination. Small alterations in fluorescence (typical of many assays) are lost within the nonspecific background.

4. Inefficient cameras and lenses. A very few systems use high-performance cameras. Even these few systems use standard CCTV or photographic lenses, and can only be applied to bright specimens.

5. Parallax error precludes accurate well imaging. As wide-aperture, telecentric lenses have not been available, these systems exhibit parallax error when imaging wells.

In one example of a prior art fluorescence system, a fiber optic is coupled to the specimen on its input, and to a CCD camera on its output. This use of a fiber optic lens in the input to a camera yields freedom from parallax error and efficient light collection. The CCD camera can be run in photon counting mode to obtain single photon detection capability. In achieving parallax-free images and high sensitivity to light, the fiber-coupled camera is like the present invention. However, fiber coupling to the specimen has the following major disadvantages:

1. A fiber-coupled system is limited to specimens that are transilluminated, because there is no place to insert an epi-illumination mechanism. Therefore, the fiber-coupled system would not be as sensitive to subtle variations in fluoresence as is the present invention (epi-illumination).

2. Because fiber optics have a very shallow depth of field (typically about 1 $\mu$m), the fiber-coupled system must view the specimen through a thin, clear film of glass, plastic, or other material. Not all assays can be conducted in plates having thin, clear bottoms. If assays must be conducted in opaque plates, the fiber-coupled system becomes inefficient, because it can not be brought close enough to the fluid within the wells to achieve focus.

3. Because of its limited depth of field, a fiber-coupled optic exhibits compromised performance with deep specimens. For example, fluid in well plates is typically more than 1 mm deep. Only a small part of the fluid is in focus with a fiber-coupled optic. This leads to inefficient light collection from those parts of the fluid that do not lie in critical focus.

4. The fiber coupled system could not be used for fluorescence polarization studies, because of the effects (birefringence, etc.) of the fiber on polarized light.

5. Well plates are 8×12 cm. Image forming fiber optics of this size are very difficult and expensive to construct, and must be brought to a much smaller CCD by tapering the fiber bundle into a minified configuration. Minification results in major losses in transmission efficiency, which might drop from 70% to 10%. To avoid both the high cost of a large fiber optic, and the loss of transmission efficiency resulting from minification, the specimen would have to be acquired as a number of subimages. In this case, a translation table moves the specimen or camera, and a straight or slightly minified fiber bundle of reasonable size is used. Following a scan, the subimages would be reassembled to show the entire specimen. This multiple acquisition is slow, affects accuracy and precludes use of the device with assays which change over time.

Other examples of prior art fluorescence systems include use of a cooled CCD camera, with an illuminator that is mounted laterally, or above the specimen. In some cases, an excitation filter wheel can be inserted prior to a fiber optic light delivery system, to achieve some of the functions of the present invention (selection of wavelengths). These prior art systems all have the following major disadvantages:

1. A side or top-mounted illuminator results in very uneven illumination with almost any specimen, and is completely unsuitable for use with wells.

2. Systems lack a telecentric lens, so parallax would preclude imaging of assays in wells.

3. Target detection software is lacking.

There is another prior art fluorescence system (Fluorescence Imaging Plate Reader—FLIPR, Molecular Devices) which uses laser illumination applied at an angle to the wells in a 96 well plate. A pinhole mask is placed over the wells, so that the angled light only reaches a small part of the specimen fluid at the bottom of each well. Data are detected using a cooled CCD camera. FLIPR is inflexible, in that it runs only in 96 well format, uses specific laser lines, does not offer epi-illumination, cannot illuminate the entire fluid contents of deep wells, and is not applicable to luminescence imaging, free format imaging, or higher density well formulations.

Science Applications International Corporation (SAIC, San Diego, Calif) was developing the RTFluorimeter, a high throughput fluorescence screening system for kinetic assays in 96 well format. The RTFluorimeter includes a robot for well filling, a high power arc lamp, a filter wheel for excitation wavelength selection, and a CCD array detector. The system illuminated using angled fiber optics placed at the sides of the specimen, and did not include epi-illumination. Performance data and specific imaging design information have not been forthcoming, and this system has been discontinued.

There is extensive prior art in the use of imaging to detect fluorescence assays incorporated within microfabricated devices (often termed "genosensors"). Some genosensors use scanning imagers (e.g. the Molecular Dynamics or Hewlett Packard genechip readers), and detect light with a photomultiplier. Others use area CCDs to detect alterations at assay sites fabricated directly onto the CCD, or onto a coverslip that can be placed on the CCD. It can be envisaged that many other types of genosensors will appear in the near future.

Advantages of the Present Invention for Area Fluorescence Imaging

Macro Fluorescence

Novel features of the present invention minimize the disadvantages of prior art macro fluorescence systems. These features include the following:

1. The device can accept light from almost any source. Therefore, illumination wavelengths may be selected without regard to the peak(s) of a gas discharge lamp or laser.

2. Using a computer-controlled filter wheel or other device, illumination may be altered during an assay, 3. Small alterations in fluorescence emission can be detected, because fluorescence illumination comes via epi-illumination. Direct excitation illumination does not enter the optics, and the nonspecific background is as low as possible.

4. The camera and lens form a highly optimized system for use with dim specimens.

5. The telecentric lens removes parallax error so well plate assays are accurate.

6. The optics can be adapted to many forms of fluorescence, including time resolved and fluorescence polarization assays.

7. The entire fluorescence illumination and detection system is integrated within a single mechanical assembly. This assembly is easy to integrate with automated specimen handling equipment.

For fluorescence, a critical advantage of the present invention is its epi-illuminating lens. It is flexible in application, allows simultaneous imaging of the entire specimen, illuminates, collects data without high levels of background or parallax error, is easily integrated with specimen handling automation, and is usable with dim specimens.

In one particular, adaptability to opaque media, the lens of the present invention minimizes the disadvantages of a fiber-coupled optic. The lens focuses some distance away from the specimen, uses epi-illumination, and has large depth of field. These features allow the focusing of fluids lying within opaque media and, more generally, focusing of fluids of typical depth (e.g. 1 mm). Another advantage of the present invention is that, as there is no fiber optic lens to act as a light scramble, fluorescence polarization assays may be performed. Finally, the lens of the present invention images the entire well plate in a single acquisition. This avoids the need for translation tables, and makes both accurate calibration and dynamic assays much easier to perform.

Genomic Assays

In one particular, the present invention has advantages for genomic assays. Genomic assays are in flux, and many labeling methods (fluorescence, luminescence, absorbance, isotopic) and formats are likely to appear. Unlike the scanning imagers currently used for these genomic assays, the present invention allows almost any specimen format (including wells), any fluorescence wavelength, and is capable of luminescence detection. Luminescence methods can offer the highest levels of sensitivity in some genomic assays.

The flexibility of the present invention is unique, and makes it suitable as a single tool for laboratories performing genomic assay prototyping. In assay prototyping, is can be difficult to predict the specific wavelengths and specimen formats that will be used. The present invention allows a laboratory to construct an assay using almost any labeling and detection paradigm. There is no need to select from the small number of labeling and detection methods supported by a specific laser scanner.

The present invention could also be used for mass screening (using high-volume fabrication), when scanning laser excitation is inappropriate, or when luminescent detection is required. In sum, it is a purpose of the invention to provide a more flexible alternative to prior art laser scanning of genomic assays.

Summary of Area Fluorescence Imaging

The present invention includes features that are novel, both singly and in combination. These are:

1. macro epi-illumination;
2. ability of a single instrument to conduct both accurate (parallax free, calibrated) fluorescent and non-fluorescent assays;
3. freedom from parallax;
4. easily adapted to fluorescence polarization, time resolved fluorescence, and other methods;
5. easy integration of fluorescence illumination with specimen handling and dispensing automation;
6. software includes calibration methods that minimize errors inherent to area imaging;
7. software finds and quantifies targets.

A system in accordance with the present invention includes a CCD detector, lens, illumination system, imaging system, and software. Together, these components are configured as a system that can be used with fixed or free formats, with wells or flat specimens, and with any form of illumination (fluorescence, luminescence, transmission). The system exhibits measurement performance similar to that of standard, non-imaging measurement instruments, while having the additional advantages of an imaging system.

Major Components of a System in Accordance with the Invention a) Sensitive CCD Detector Area imaging systems use CCD arrays to form images. Factors which influence the ability of CCD arrays to detect small numbers of incoming photons include quantum efficiency, readout noise, dark noise, and dynamic range. Preferably, the present invention uses a CCD array with high quantum efficiency, low readout and dark noise, and broad dynamic range.

b) A Lens Which Combines Telecentricity and Large Aperture

The lens of the present invention is unique in that it combines telecentricity with a large aperture. This combination allows accurate reading of dim assays within wells.

c) True Epifluorescence Optics

An epifluorescence optic both illuminates and collects through the same lens. Epifluorescence optics must include a source of excitation, and a barrier filter which removes excitation from the detected signal and leaves only the fluorescence emitted from the specimen. The present invention incorporates both a source of excitation and a barrier filter within its lens.

The epifluorescence optics are beneficial in yielding lower backgrounds, broader dynamic range, and more linear fluorescence response than dorsal, lateral, refractive, or transilluminators. The ability to deliver large area, monochromatic epi-illumination is a unique capability of the present invention.

d) Optional Components for Ultra-Low Light Imaging

Although any area detection technology may be used, the preferred detector is a thinned, back-illuminated and large CCD, which is capable of imaging even low levels of fluorescence and luminescence. For the most extreme low light conditions, as with the scintillation proximity assay, the present invention allows use of a camera cooled to very low temperatures (e.g. the CCD runs at −70 degrees C). Cooling may be by liquid nitrogen, forced probe mechanism, multistage thermoelectric, or any other means. As an alternative, the present invention allows substitution of a fiber optic lens for the epi-illuminating lens. This use of a fiber optic lens sacrifices flexibility and fluorescence capability, in return for higher sensitivity with luminescent assays.

The present invention also allows use of a light amplifier, inserted between the lens and the CCD camera. In one preferred configuration, this light amplifier is an image intensifier.

e) Flexible Illumination Source for Fluorescence Excitation

Application of even illumination of selectable wavelength over an 8×12 cm area is a feature of the present invention. Illumination is delivered via a standard fiber optic coupling. This allows the use of almost any illumination source (halogen, arc lamp, laser, etc.). In a preferred configuration incorporating a halogen or arc lamp, any wavelength of monochromatic illumination may be selected by precision filters (usually standard interference filters). These are readily available in the small sizes used. An optical coupler/computer-controlled filter wheel is preferred for selection of excitation wavelengths. The output of this device may be taken to a specially designed fiber optic plate for transillumination, to a fiber optic ring, line, or panel light for dorsal illumination, or (preferably) to a fiber optic illumination assembly within the lens, for epi-illumination.

f) Software That Integrates Control, Detection, and Analysis

Area imaging is inherently more complex than either nonimaging detection, or the use of scanning imagers. In particular, nonimaging counting systems have a relatively easy task. They only need to control the scanning process, control internal calibration, and create a small array of data points representing each well. The sequence of steps might be as follows:

1. Calibrate detector against internal standard.
2. Illuminate one well.
3. Position a PMT over the illuminated well.
4. Read well.
5. Transfer data to spreadsheet.
6. Illuminate next well and repeat.

An area imaging system has a much more difficult task. Imaging a well plate might include the following requirements:

1. Provide adequate illumination over the entire plate.
2. Control a high performance camera.
3. Store geometric and density correction factors.
4. Image specimen.
5. Correct geometric and density variation.
6. If necessary, calibrate image to standards within the specimen.
7. Locate each well and quantify intensity, with respect to a calibration function.
8. Transfer data to spreadsheet.

These tasks can only be performed if the imaging system is equipped with software that performs functions 2–8, above.

The present invention incorporates such software, including novel software for locating specimens, and for calibrating the imaging system to minimize error.

g) Optional Components for Time Resolved and Polarization Fluorescence

A standard way to minimize background is to take advantage of the long-lived fluorescence properties of specific fluors. With a long-lived fluor, the illumination source can be strobed very rapidly, so that excitation is applied for a brief period, and is then blocked. Fluorescence tends to fade gradually (e.g. over a period of 10 msec after blocking of excitation), so measurement can be made during the excitation blocking period. This measurement after blocking of the excitation illumination should be free of reflections, and of direct contamination by the excitation wavelength. This delayed measurement is known as time-resolved fluorescence (TRF).

The major advantage of TRF is that it results in much lower levels of background fluorescence. The major disadvantages of TRF are that it requires specialized hardware for the rapid cycling of excitation and blocking, and that a limited number of special fluors (typically using Europium, Lanthanide, or Terbium chelates) are suitable for the procedure.

Typically, the present invention is applied to time resolved fluorescence by using both a shutter and a strobe light source. The strobe provides brief and precisely gated periods of illumination. The shutter protects the CCD from exposure while the illumination is on.

Various types of shutter are possible:

An image intensifier is mounted between the epi-illuminating lens and the CCD detector. The intensifier serves to amplify the light coming from the fluor and, by gating, the intensifier serves as a shutter. When the intensifier is gated on, light is allowed to reach the CCD. When the intensifier is gated off, light is prevented from reaching the CCD. Gating can be very quick, so that the intensifier on period coincides with the optimal period of delayed fluorescence from the specimen.

A chopper wheel, liquid crystal, leaf, or other shutter may be mounted within the optical path, after the specimen but prior to the detector. For example, the shutter could be located at the barrier filter position within the lens. The shutter is time-locked to the excitation strobe, so as to achieve the required delay between the on-off cycle of the strobe, and the exposure period of the CCD.

Although the preferred illumination source is a strobe lamp, other forms of illumination (e.g. pulsed laser, pulsed arc lamp, continuous arc lamp) may be envisaged by those skilled in the art. If the illumination cannot be gated precisely, a second shutter mechanism is required to provide a precise on-off cycle.

A critical advantage of the present invention for TRF is that illumination is applied via the telecentric, epi-illuminating lens. This lens provides a convenient means by which fluorescence excitation may be applied, telecentric collection free of parallax, and efficient optics that collect as much as possible of the dim light emitted in delayed fluorescence paradigms.

The lens of the present invention may also be configured for fluorescence polarization studies, by adding a ring polarizer on the output of the internal ring light, and an analyzer into the lens barrel.

Features of the Analysis Software Finding of Targets

An image contains both targets and background. Often, there is some ambiguity about which parts of the image constitute the target component. Extensive prior art deals with the automated extraction of target data from images. The extraction process is known as "segmentation". Typically, segmentation algorithms use density, color, texture, or other image characteristics to define a valid target. Any pixel that meets the target definition criteria is designated as a target pixel.

The present invention performs segmentation of the usual kinds, using any combination of image characteristics, in addition to novel forms of segmentation. The usual type of segmentation is preferable for free format specimens. Typically, targets are defined by their luminance value, and are then detected automatically at any points within the image. For imaging of wells, hybridization arrays, and other specimens in a regularly spaced (fixed) format, the present invention uses a novel form of segmentation which allows very large numbers of targets (e.g. 60,000) to be analyzed, with full automation.

The novel segmentation procedure uses a "fixed probe" strategy, in which an array of probes of constant size is placed onto the sample. For this purpose, an analogy is made to liquid scintillation counting. In liquid scintillation counting of isotopically labeled specimens it is common to cut out (using a circular punch) pieces of membrane of fixed size. These pieces are placed into vials of scintillation fluid for counting. As a result of the count, the total amount of radioactivity in each sample piece becomes known. Similarly, with the present software, an array of fixed probes is applied to the image, at intervals specified by the grid definition.

Positioning software is required, because the array of computer-generated probes is unlikely to accord exactly with the true locations of all the targets in the specimen. Variation in target position arises because spotting robots are not perfect, plates may vary slightly in position, and so forth. Therefore, prior to quantification, the image is processed and parsed to rationalize the location of each target within the array. Essentially, the algorithm looks for any targets that may be recognized on the basis of distinct densities. It fits these recognizable targets into the most likely locations within the grid, using a fuzzy logic algorithm. Then, it fits the less distinct dots into their most likely locations, using the higher-density dots as anchor points for the alignment.

To the user, the procedure appears automatic. Once the fixed probe array has been defined on the specimen, the computer performs automatic alignment of the array elements to the most appropriate positions in the matrix. Any elements that remain misaligned may be manually edited.

Statistical Segmentation

Luminance data from the aligned matrix are output to software, which creates a distribution of data from every fixed probe. Typically, a mean and standard deviation are calculated for this distribution, and targets may be further defined as "hits" using a variance criterion for the distribution. For example, we might define targets that lie more than four standard deviation units from the mean of the distribution as hits. This use of variance-based hit definition is termed "statistical segmentation".

Statistical segmentation requires that every sample in the matrix be analyzed, even if it is not detectable by standard segmentation methods. Therefore, when used for well plate or other grid assays, statistical segmentation requires the use of aligned, fixed probes as described above.

The Measurement Efficiency Calibration

The present invention implements a novel means by which measurement efficiency may be corrected. This allows correction of variations in collection efficiency of the lens or camera. In practice, the system views a set of reference standards which span all or part of the range of intensities observed in actual specimens. Typically, these standards will be well plates of the same kind, and containing a substance responding to the same wavelengths as are to be used for the assay in question. Preferably, three (or more) plates are made to contain low, medium, and high concentrations of light emitting substance. The use of multiple reference concentrations allows nonlinear variations in measurement efficiency to be accommodated.

Once the reference plates have been viewed, the system can derive discrete models for measurement efficiency at each well. That is, the reference plates allow us to create, at each spatial location in the image, a known relation between the intensity of light observed by the system, and the concentration of light emitting substance that is actually present. The system uses these data to model and correct subsequent measurements obtained from each well. The result is a low level of error variation between wells. Typically, the present invention yields coefficients of variation that are very similar to those obtained from nonimaging counting systems. This use of a correction for well-to-well variation in measurement efficiency is highly advantageous, if an area imaging system is to achieve acceptable accuracy in quantifying wells.

BRIEF DESCRIPTION OF THE DRAWINGS

Further objects, features and advantages of the invention will be understood more completely from the following detailed description of a presently preferred, but nonetheless illustrative embodiment, with reference being had to the accompanying drawings, in which.

DETAILED DESCRIPTION OF THR PREFERRED EMBODIMENTS

Figure 1:
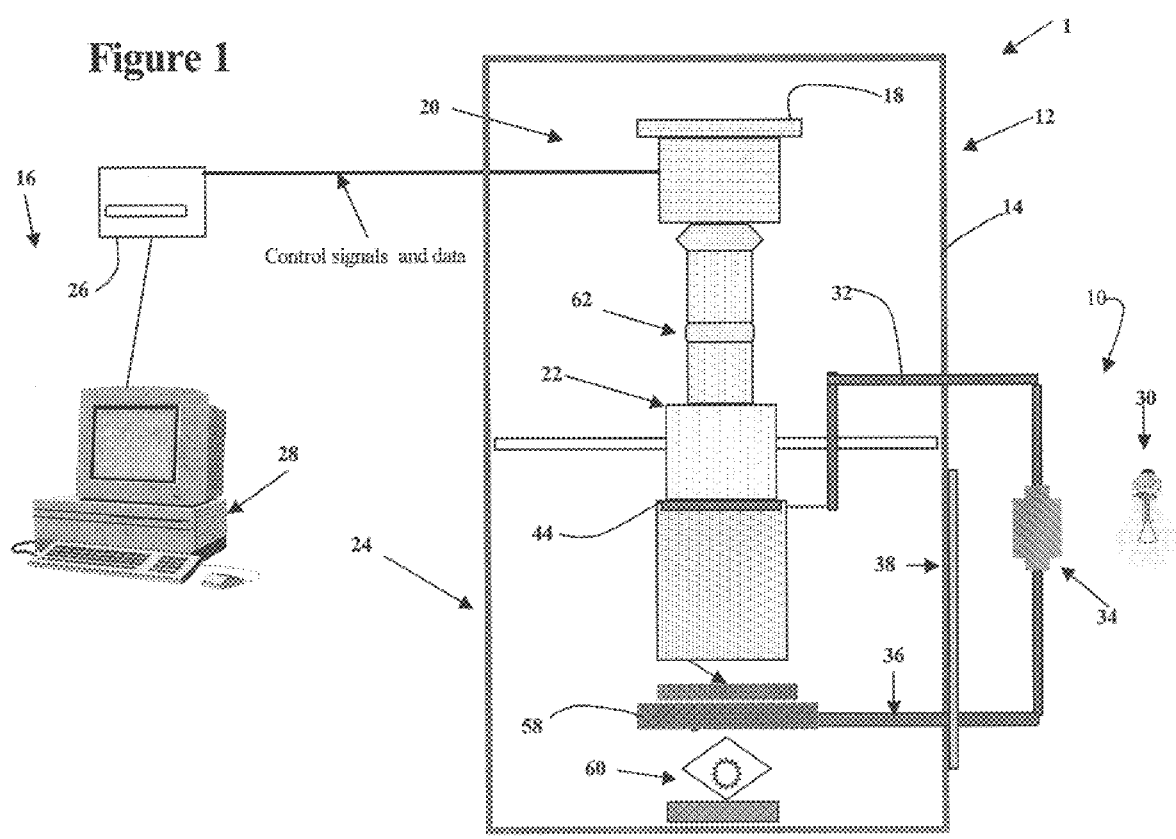
FIG. 1 is a schematic illustration of a system in accordance with a first preferred embodiment (upright) of the invention.

Turning now to the details of the drawings, FIG. 1 is a schematic diagram illustrating a preferred embodiment of an imaging system 1 in accordance with the present invention.

System 1 broadly comprises an illumination subsystem 10, an imaging subsystem 12 provided in an housing 14, and a control subsystem 16. The imaging subsystem 12 comprises a CCD camera subsystem 18 housed within a camera chamber 20 of housing 14 and a lens subassembly 22 extending between camera chamber 20 and a specimen chamber 24. In operation, illumination subsystem 10 provides the necessary light energy to be applied to the specimen within chamber 24. Light energy emitted by the specimen is transmitted through lens subsystem 22 to camera 18, where an image is formed and transmitted to the control subsystem 16 for processing. Control subsystem 16 comprises a camera control unit 26, which is a conventional unit matched to the particular camera 18 and a computer 28 which is programmed to control unit 26 and to receive data from camera 18, in order to achieve unique control and processing in accordance with the present invention.

The light source for the illumination subsystem 10 is preferably an arc lamp 30. Light from lamp 30 is conducted via an optical coupler 34 and filter wheel X mounted on the output of lamp 30. A fiber optic 32 carries illumination from the optical coupler 34 to the ring light 44 within the lens 22. Alternatively, a liquid or fiber light guide (not shown) may be placed on the output of lamp 30, and taken to a simple optical coupler (not shown) and thence to fiber optic 32.

The filter wheel X contains a number of one inch diameter interference filters. The filter wheel position can be rapidly changed under computer direction, giving the ability to conduct procedures which require more than one excitation wavelength.

Fiber optic bundle 32 carries illumination from the optic coupler/filter wheel 34 to the ring light within lens 44. The bundle 32 enters lens 22 through a mounting flange, placed so that bundle 32 does not need to pierce the wall of the light-tight specimen chamber 24.

Two forms of illumination system are described, each fed by a discrete fiber bundle. These are a transilluminating plate (not shown), used for absorbance or colorimetric assays, and a ring light 44 internal to the lens (22) that performs epi-illumination for fluorescence assays.

The internal ring light 44 consists of one or more rings of optical fibers, mounted within and axially aligned with the body of the telecentric lens 22, and behind its front lens element. It is advantageous to have multiple rings, in that one ring may be angled optimally for even delivery of illumination over most of the specimen, while the second ring may be angled optimally to deliver additional illumination to the edges of the specimen.

An input polarizer is positioned in front of the illumination ring 44 to supply the polarized excitation. By putting the polarizer close to the output of the fiber optic, any effects of polarizer fluorescence are minimized. That is, only emitted fluorescence that is reflected in the surface of the front element of the telecentric lens assembly has the potential to reach the CCD detector. The input polarizer is of ring form, with a hole in its center allowing light to travel up the lens barrel without hindrance. A second polarizer functions as an analyzer (not shown), and may be placed at any position within the lens barrel. A preferred location is at the plane of the excitation polarizer.

The specimen well plate is carried within a holder 58 that is mounted to a focusing drive 60. The holder 58 grips the well plate at its edges. The bottom of the holder 58 is empty, so as not to impede viewing of the wells. By adjusting the focus drive 60, the holder 58 moves relative to the lens 22 and the specimen is focused. The lens 22 is telecentric with a wide aperture. The lens contains an emission filter slot 62, which accepts interference filters for fluorescence imaging. It contains an internal fiber optic ring light 44, positioned behind the front lens element. The lens 22 is mounted to the camera chamber by a flange 64 near its middle. The back of the lens projects into the camera chamber 20, providing ready access to the emission filter slot 62 without disturbing the specimen. The front of the lens projects into the specimen chamber 24.

The cooled CCD camera 18 is mounted with the detector placed as close as possible to the lens. Minimal spacing between the final lens element and the CCD is important to an efficient transfer of light from the lens to the CCD.

The entire system 1 is constructed to achieve high transfer efficiency. Three factors dominate the transfer efficiency (photoelectrons generated/photons emitted) of the detector system. These are the light collection efficiency of the lens, the quantum efficiency of the CCD detector, and the lens transmittance. We can calculate the number of photoelectrons generated as follows:

$$N_{pe} = \tau * \phi_{detector} * c.e. * N_{photons}$$

where τ is lens transmittance, about 85–90% for our lens where φ is quantum efficiency of the CCD detector, typically about 35–40%, up to 80% in our case c.e is collection efficiency of lens, about 0.3% in our casein a typical scientific grade CCD camera system, using the fastest available photographic lens (F/1.2), and with a high quality cooled detector, the CCD will generate 1 photoelectron for about 5,000–10,000 photons generated from a point source in the sample.

The lens of the present invention offers a collection efficiency about that of an F/1.2 photographic lens. The efficiency of the CCD detector is about double that of other CCDs. The result is that the present invention has the theoretical ability to generate one photoelectron for about 2,500–5,000 photons generated from a point source within the sample. This very high transfer efficiency allows detection of specimens that cannot be imaged with prior art systems.

Control Subsystem

The control subsystem 16 comprises control unit 26 and computer 28. The camera control unit is a computer controllable unit provided by the manufacturer of camera 18 to control the camera. Computer 28 is preferably a conventional computer running in the Windows® environment and is programmed to achieve image acquisition and analysis in accordance with the present invention. All software control, imaging, and analysis functions are resident within the computer 28.

Illumination Subsystem

The preferred configuration of the present invention uses a broad-band illumination source, such as a halogen lamp or mercury-xenon arc lamp. The advantage of an arc lamp is that its output can be made into a narrow beam that can be passed through a small and readily available interference filter, before being spread over the entire surface of the specimen. Any wavelength of monochromatic illumination may be selected by precision filters (usually interference filters) mounted after the lamp. Filters are preferred, because variable monochromators or tunable lasers lack sufficient light output when diffused over large areas.

Although the present invention can be configured to apply diffuse transillumination (through the specimen) or other forms of dorsal or lateral illumination, epi-illumination is preferred because it usually results in lower backgrounds, broader dynamic range, and more linear fluorescence response.

Figure 2:
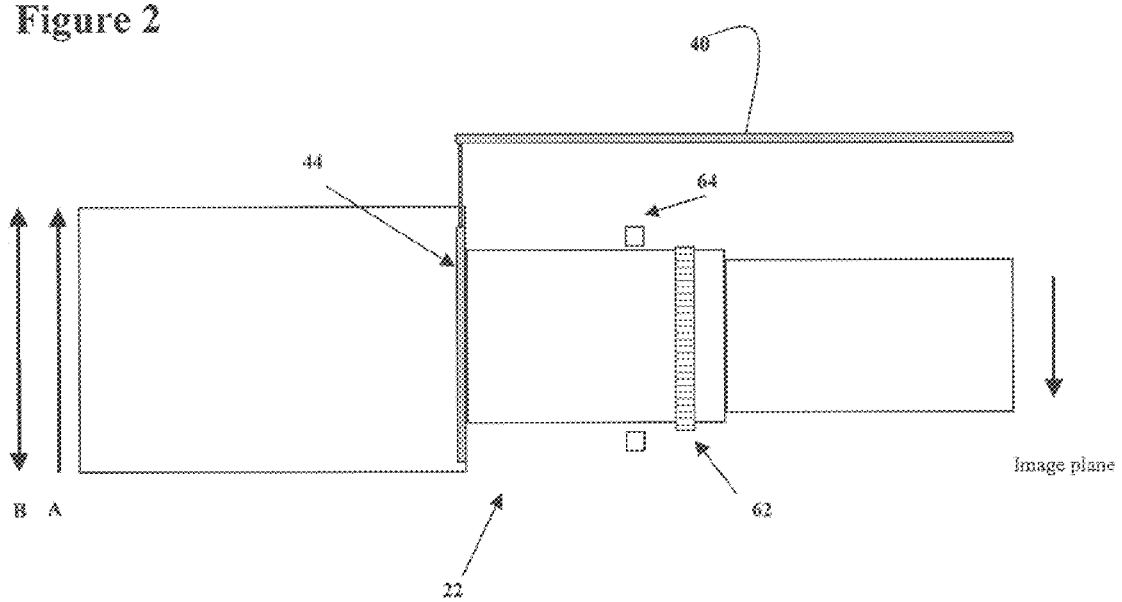
FIG. 2 is a detailed illustration of the optical and mechanical components of the lens and the emission filter holder.

FIG. 2 shows best the optical components of the telecentric lens 22. The lens has the following characteristics:

| Effective focal length | 164.436 mm |
| Numerical Aperture | 0.443 |
| Magnification | 0.25 |

The lens has mounted within it a fiber optic ring light 44, which projects excitation through the front lens element onto the specimen (leftward in FIG. 2). The lens is so calculated that the focus plane of the ring light is at B, while the focus plane of the entire lens is in front of that point, at A. Placing the focus of the ring light at a point beyond the specimen minimizes specular reflections from the specimen.

The emission filter slot 62 allows insertion of an interference filter (a barrier filter) that removes excitation illumination and other unwanted light from the incoming rays, leaving only the fluorescence or other relevant signal emitted by the specimen. The barrier filter is coated to minimize reflections. A critical advantage of the present lens is that the internal beam is collimated at a position appropriate to the insertion of a barrier filter. At this position, rays are nearly parallel. The collimated beam at this point is critical, because interference filters perform best with rays that are incident at 0 degrees. If the incoming illumination is at an angle, the filter exhibits both broadening of its transmission characteristics, and alterations in the wavelengths that it passes.

It is to be appreciated that the lens of the present invention implements a unique form of macro epi-illumination, without need for a dichroic mirror. In epifluorescence microscopy, where small areas are illuminated, a dichroic beam splitter is usually placed behind the objective. A dichroic beam splitter or mirror is a partially reflective surface that reflects one wavelength range, while allowing another wavelength range to pass through.

On a fluorescence microscope, illumination enters the dichroic mirror from the side. The mirror is reflective with respect to the excitation illumination, and is angled to reflect the excitation light down through the objective toward the specimen. Fluorescence emitted by the specimen (shifted up in wavelength from excitation) is collected by the objective, which passes it upwards towards the dichroic mirror. The dichroic mirror is transparent to the emission wavelength, so that the light proceeds through the dichroic to the detector plane. A different dichroic is required for each excitation/emission wavelength. There are major difficulties in applying a dichroic-based epi-illumination system to macro imaging:

1. The dichroic mirror must be at least as large as the objective it must fill. Camera lenses are much larger than microscope objectives, and would need correspondingly large dichroic mirrors. Dichroic mirrors this large are not readily available, costly, and subject to internal variability.

2. It is critical that the back lens element of a macro lens be mounted as close as possible to the CCD. Any increase in the distance between the rearmost lens and the CCD markedly impairs the working F number and the light-gathering efficiency. Therefore, there is no room for a dichroic to be mounted behind the lens and the dichroic would have to be mounted within the lens itself. Although dichroics have been mounted within microscope objectives, dichroics mounted within a macro lens have not been described. Our own tests with one such arrangement have revealed difficulties in achieving low backgrounds and even illumination.

3. In a normal epi-illumination system, the dichroic reflects excitation through the entire lens. This has two disadvantages.

Each lens adds its own autofluorescence to the total background. This may not be a major problem with the small lenses and very bright illumination levels found in microscopy. With macro lenses and lower light levels, however, glass autofluorescence becomes a greater component of the total signal seen by the detector.

Transmission of excitation illumination is highly subject to the optical characteristics of the glasses used in the lens. Very costly (and difficult to work) quartz glass optics are required for UV epi-illumination. These UV-transparent optics can be constructed in the small sizes needed for a microscope objective, but would be astronomically expensive in the large sizes described for the present invention.

4. Dichroic beam splitters absorb light. Typically, they are 80–90% efficient. The present invention functions without a dichroic mirror. Rather, the illuminator 44 is mounted so that it shines directly at the front lens element X, from behind. This illuminates the specimen, without any need of a dichroic mirror.

Illuminating from within the lens is possible as a result of the novel features of the present invention. These features include:

a) calculation for avoidance of detection of internal reflections and autofluorescence;
b) calculation for effective use of an emission barrier filter, located within the lens and posterior to the illumination source;
c) design so that only one of the lens elements resides in front of the internal illuminator.

It is a key advantage that the lens of the present invention has only one element X in front of the illumination source 44. This feature has the advantages that internal flare, reflections, and glass autofluorescence are minimized, and that only the front element needs to be transparent to UV. A single UV-transparent lens is costly, but not prohibitively so. A further advantage of having only one lens in front of the illumination system is that generation of a polarized illumination beam is made much less difficult. A polarizer may be placed in front of the illumination source, and has only to pass light through the front lens element before affecting the specimen. In the present invention, the front lens can be specified to have minimal effects upon a polarized light beam. If more lenses resided in front of the illumination system, it would be much more difficult to achieve minimal effects upon polarized light.

The front element of the lens is calculated so as to focus the illumination source at B, beyond the plane of the specimen at A. The defocus of the illumination source at the specimen plane minimizes specular reflections. As many well plates are constructed of polished plastic, and tend to generate specular reflections, this is an important feature.

The lens is highly efficient. A typical collection F/# of the lens is 4.5 (working F/1.15). This implies a collection solid angle of 0.03891 sr, and a collection efficiency of 0.03891/4□=0.3096%. For this typical lens, expected transmission value is 0.85–0.90, giving an overall collection efficiency of 0.263–0.279%. This is about equivalent to the collection efficiency of a photographic lens of F/1.2.

The present telecentric lens has a fixed field of view (12 cm diameter, in this case) but, if larger specimens need to be imaged, a motorized translation table may be mounted within the light-tight chamber. The translation table moves the specimen relative to the lens, under computer control. After each motion, a single "tile" is acquired. When the entire specimen has been imaged, all the tiles are recomposed (by the software) into a single large image, retaining telecentricity, freedom from parallax error, and high resolution over its entire surface.

The lens may also be constructed in various sizes and magnification factors to allow larger or smaller specimens to be imaged onto the full extent of the CCD. When used with small, high density DNA arrays, for example, the lens could be constructed without telecentricity, and at a much higher magnification factor so as to image the array at high resolution in a single acquisition. With this new lens calculation, the key principle of using epi-fluorescence to illuminate the entire specimen would be retained.

Figure 3:
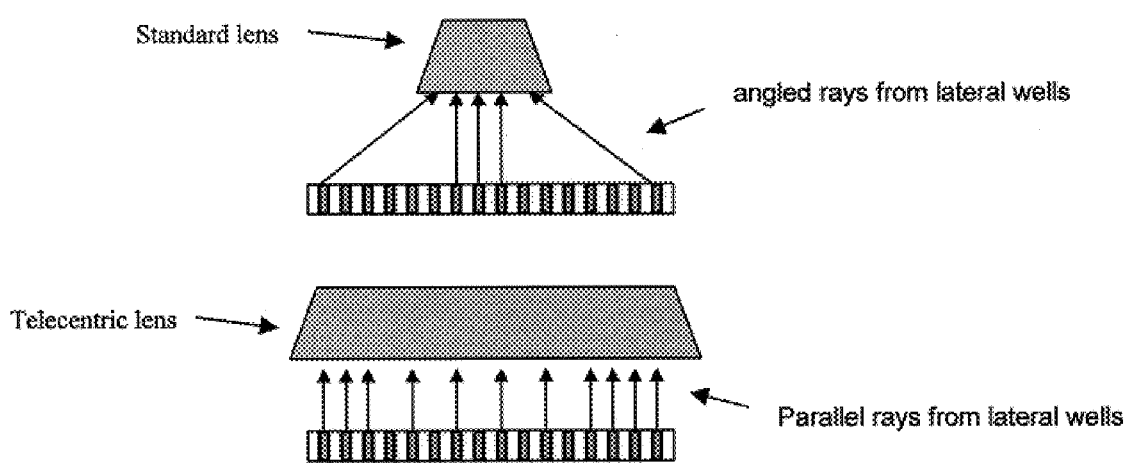
FIG. 3 illustrates schematically the benefit of the telecentric lens.

FIG. 3 shows best the telecentric property of the lens 22. Although an epi-illuminating lens could be constructed according to the present invention and without telecentricity, a telecentric lens collects parallel rays, over the entire area of a well plate. Thus, it does not peer into any wells at an angle and is free of parallax error. In contrast, images of deep, narrow targets, made with standard lenses, exhibit severe parallax. That is, geometric distortion increases at the edges of the field of view. With a non-telecentric lens, circular targets (such as wells) at the center of the image are seen as true circles. However, the lens peers into lateral targets at an angle. Therefore, these lateral targets are seen as semilunar shapes, and the lens fails to image parts of lateral wells.

Figure 4:
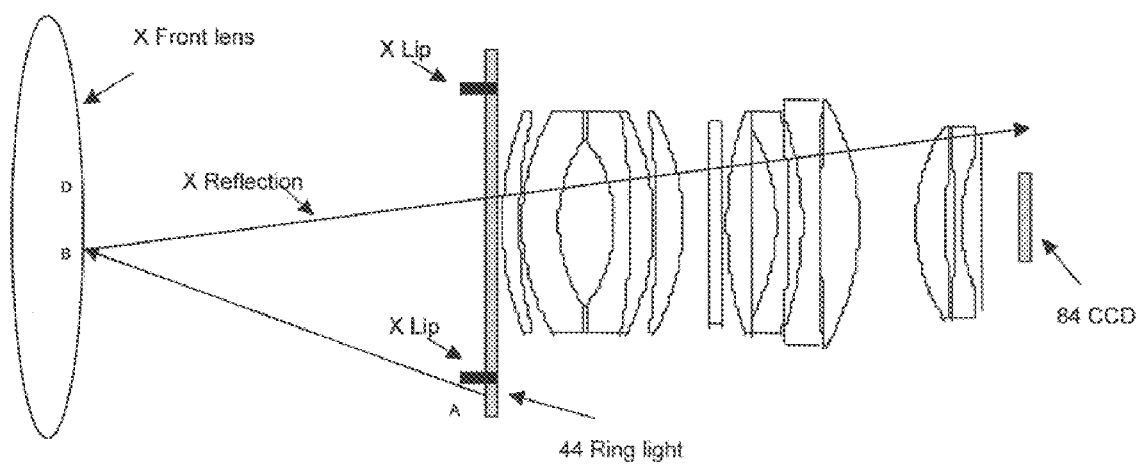
FIG. 4 is a schematic illustration of how reflections that would be detected on the CCD are avoided.

FIG. 4 shows the path of light rays proceeding from the fiber optic ring light 44. Light from the ring 44 strikes the front lens element X, which is coated to allow most of the light to pass through towards the specimen X. However, a small proportion of the light incident to the front lens is reflected back towards the CCD detector 84. Even though these reflections are much less intense than the illumination source (e.g. <0.2%), they are very intense relative to the weak fluorescence emission of the specimen. That is, fluorescence from the specimen may well be on the order of 0.1% of the excitation intensity. Therefore, reflections within the lens would conflict with fluorescence from the specimen, and would degrade the sensitivity of the imaging system.

In the present invention, reflections from lens surfaces ahead of the illumination source are not detected. In calculating the destination of rays which reflect from the front lens element X, it can be determined that only some of the reflections arising from lens X strike the CCD 84. For example, a ray X is shown emanating from ring light 44 at position A, and striking lens X at position B. The reflection X of this ray X is shown striking a point C that does not lie on CCD 84. However, rays from position A on ring light 44 that struck front lens X at position D would reflect to strike CCD 84.

The lens of the present invention contains a mechanism that blocks excitation rays that would strike front lens X at locations which create bothersome reflections. Light rays emitted from ring light 44 are emitted at an angle (5 degrees in this case) directed inwards towards the center of lens X. Normally, these rays would strike the entire surface of lens X, generating reflections that would be highly evident in the image formed at CCD X, and which would degrade the sensitivity of the system. These undesirable rays are blocked by a lip X, placed as a ring just inside the ring light 44. In effect, lip X shadows the front lens X from rays which would generate reflections.

The rays which are permitted to pass lip X still generate reflections internal to the lens assembly 22, but these die within the body of the lens assembly 22 or on the body of the camera mount 18. They do not reach the CCD X. As a result of these novel design features, the present lens is able to supply an intense epi-illumination beam without the presence of detectable internal reflections. Rather, the angle of excitation incident to the front lens is so calculated that its reflections strike the inner surface of the camera mount X. Thus, reflections die within the body of the camera or lens mechanism, without reaching the CCD detector X.

FIG. 4 shows best the cooled CCD camera. The camera 18 includes a CCD element 84 positioned behind a camera aperture. A particular problem that arises with lenses of the present kind (wide aperture, back element positioned very close to the detector plane) is that the depth of field at the detector plane is very narrow. The lens of the present invention, for example, requires that the CCD be flat with respect to the optical axis of the lens, with a tolerance of 50 microns. Therefore, the present invention implements both checks during manufacture, to ensure that the CCD surface is flat, and a tip-tilt adjustment (not shown) within the camera body, allowing the CCD to be adjusted to flatness.

To reduce dark noise produced by electrons within the CCD, the CCD element 84 is mounted to a heat sink 88, which in turn is thermally coupled to a cooling element and liquid circulation system for providing enhanced heat dissipation. A lens 90 is positioned over the aperture to focus the image on the CCD element 84. The fast, telecentric lens 22 (FIGS. 2 and 3) is mounted directly to the camera body by screws, after removing the photographic lens mount. Similarly, the image intensifier 70 (when present) is mounted directly to the camera body.

Preferably, the present invention uses a CCD array with high quantum efficiency, low readout and dark noise, and broad dynamic range. Quantum efficiency (QE) describes the ability of the photodetector to convert incident photons into electron hole pairs in the CCD. Consumer-grade CCDs typically exhibit QE of about 12–15%. Standard, scientific grade cooled CCD cameras exhibit QE of about 40%. A very limited number of thinned, back-illuminated CCDs can achieve QE of as high as 80% at peak detection wavelengths.

Readout noise originates in the output preamplifier of the CCD, which measures the small changes in voltage produced each time the charge content of one or more CCD elements is transferred to it. Readout noise is directly related to the readout rate, and is decreased by use of slow readout.

Dark noise is produced by thermally generated charges in the CCD, which increase the background level. A constant dark noise level can be subtracted from the image, but dark noise also has a random noise component (a variation in level) which cannot be subtracted. This random component adds to the total random noise level of the detector, and has a direct effect upon sensitivity. Dark noise is decreased by cooling the CCD.

The size of the CCD element (typically about 2.25 $cm^2$) is related to its ability to store photoelectrons (known as the well capacity) and, hence, its dynamic range. The larger each CCD element (pixel) in the array, the larger the full well capacity and dynamic range of that pixel. A broad dynamic range is desirable, in that it allows the detector to be used for longer exposure times, without saturation. This enhances the detection of very small signals. A further advantage of large pixels is that signal to noise performance is improved, relative to that of smaller pixels. Even so, most area imaging systems use CCDs with small pixels, both because the cost is lower and because resolution is dependent upon pixel size. Large pixels sacrifice resolution to gain signal. Small pixels sacrifice sensitivity and dynamic range to gain resolution. In sum, CCD cameras have tended to trade off light sensitivity against resolution.

To achieve high sensitivity, good resolution, and broad dynamic range, CCD cameras used in astronomy often incorporate a large CCD, containing a large number of large pixels. The present invention (preferably) incorporates an unusually large CCD array (e.g. 6.25 $cm^2$), containing many (preferably >1 million) large pixels. In addition, the CCD is selected for the highest possible quantum efficiency (preferably about 70–80%). As a result, the detector of the present invention is characterized by very high sensitivity, broad dynamic range (true 16 bit), and high resolution. This synergistic combination of features is novel in its application to assay imaging.

To take full advantage of the CCD characteristics, the preferred support electronics include a high-precision digitizer, with minimal readout noise. The camera provides a 16-bit digital signal output via digitization circuitry mounted within the camera control unit, and an interface card mounted within the computer. Data from the CCD are digitized by the camera control unit are digitized at rates appropriate to the sensitivity required (e.g. 200,000 pixels/ second), and transferred directly to the computer memory.

Following the integration period, the CCD camera accepts a trigger pulse from the computer to initiate closure of the electromechanical shutter. With the shutter closed, the image is transferred from the CCD to the internal frame buffer of the computer.

Although this camera could be used without cooling the CCD element, extended periods of integration are achieved by using a CCD camera with an integral cooling element. The effectiveness of integration is limited by the degree of cooling. With a non-refrigerated liquid cooling device, sensor temperatures of about −50° C. (below ambient) can be achieved. At this temperature, dark noise accumulates at a typical rate of about 7–10 electrons/second. This type of cooling has the advantage of low cost and easy implementation.

It is to be appreciated, however, that longer periods of integration are possible if refrigerated liquid or cryogenic cooling are employed.

Figure 5:
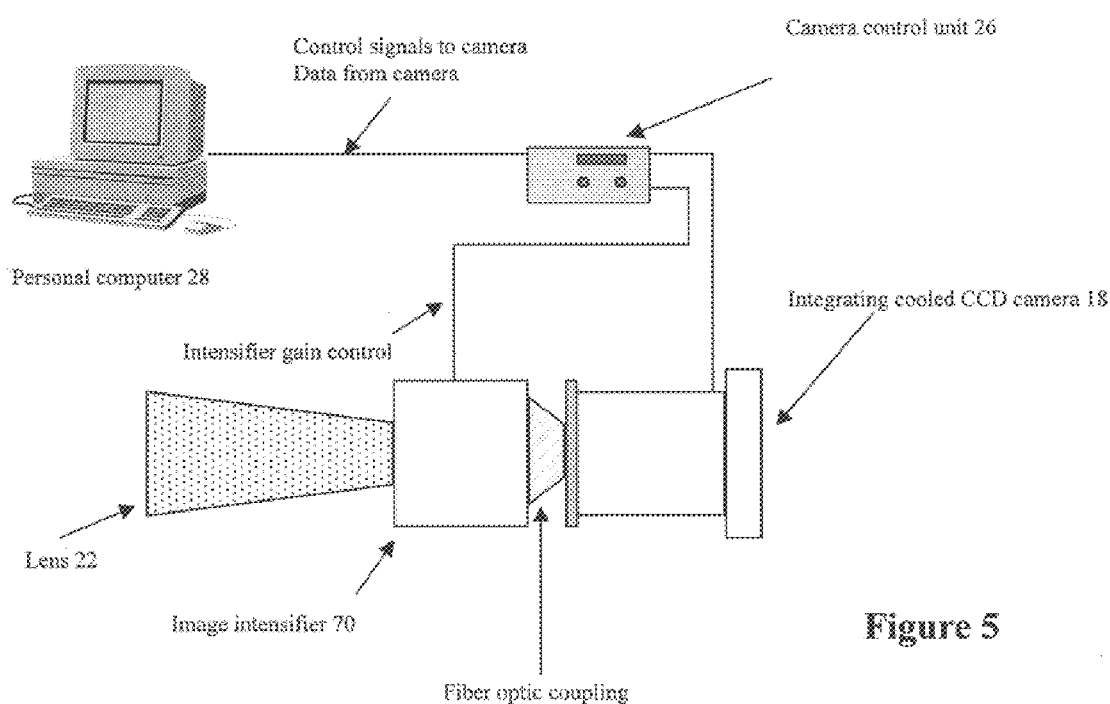
FIG. 5 is a schematic diagram of an imaging system incorporating an image intensifier.

FIG. 5 shows the optional intensifier for extreme low light and time-resolved modes of imaging. The intensifier 70 is mounted between the telecentric lens 22 and the CCD camera 18. Intensification, as for example, is disclosed in U.S. Pat. No. 5,204,533 to Simonet, involves the coupling of an image intensifier to a CCD camera. The image intensifier typically includes a photocathode, a phosphor screen, and a microchannel plate (MCP) connected between the photocathode and phosphor screen. Very high light amplification factors (e.g. up to about 90,000) are available with this type of device. The intensifier also provides shuttering capability for time-resolved and photon counting applications. With the intensifier inserted into the optical chain, the present invention becomes an image intensified CCD (ICCD) camera. In all other respects the system is essentially identical to that of FIG. 1 for extreme low light imaging.

Figure 6:
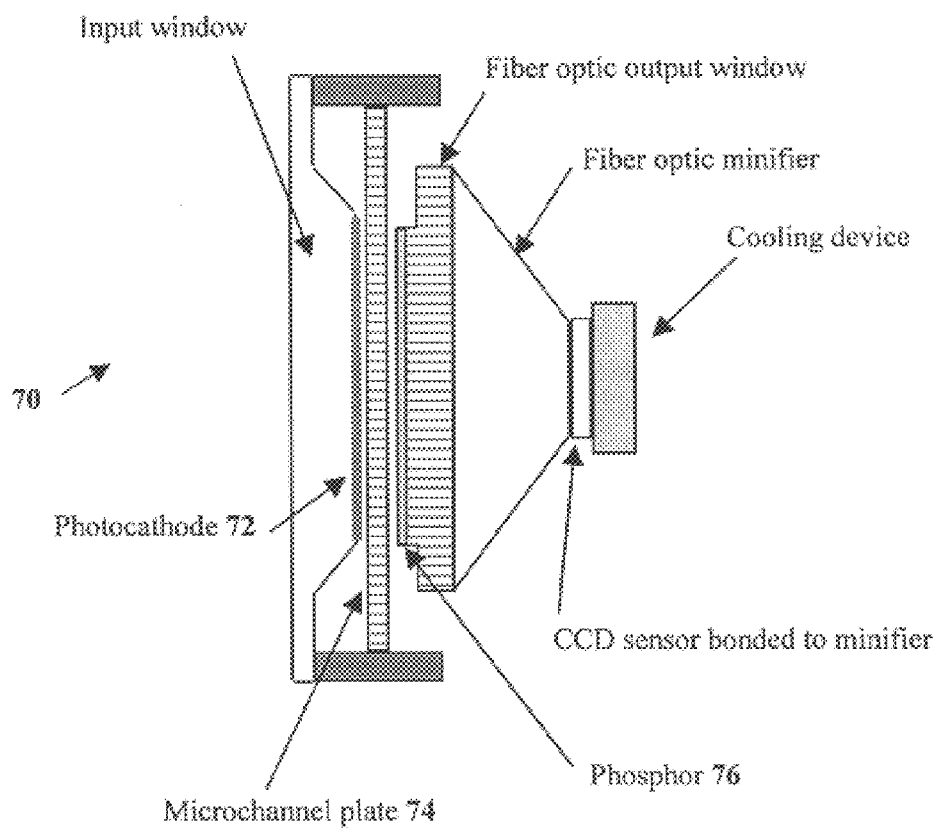
FIG. 6 is a schematic representation of the image intensifier.

FIG. 6 shows best the intensifier 70 as being of the GEN 4 type, and including a photosensitive cathode 72, a microchannel plate (MCP) 74, a phosphor screen 76, and a vacuum sealed body or enclosure 78. The epi-illuminating lens 22 (FIGS. 2,3) is placed in front of this assembly 70. At its output, the lens is focused on an input window of the cathode 72 so as to transfer the specimen image thereto. The photosensitive cathode 72 is selected to emit electrons in proportion to the intensity of light falling upon it. The MCP 74 is positioned within the vacuum sealed body 78, between the cathode 72, and the phosphor screen 76 and coupled to the cathode 72 at each end. The MCP 74 is provided with an array of small diameter MCP channels, each of which is coated with gallium arsenide. The electrons emitted from the cathode 72 are accelerated along the MCP channels to the phosphor screen 76. As the electrons from the cathode are accelerated along the small diameter channels, they strike the coated channel walls to produce additional electrons. As the multiplied electrons leave the MCP channels, they strike the phosphor screen 76 and produce an intensified image of the specimen on an output window. This image is coupled to the CCD 84 element in the camera by a lens 80.

It has been found that the use of low noise image intensifiers (e.g. GEN 4) is advantageous over other types of intensifiers. It is to be appreciated, however, that many types of intensifiers (e.g. those with photocathode cooling) may be used with the present system. Similarly devices with high intrinsic gain (such as electron bombarded back-illuminated CCD sensors) could be used in place of image intensifiers.

The integrating camera is configured so that the highly amplified image generated on the output window is carried by a fiber optic onto the CCD element. To image low light specimens, the CCD element integrates for a period. During the integration period, photons from the output window incident to the CCD element are stored as negative charges (the signal) in numerous discrete regions of the CCD element. The amount of charge in each discrete region of the CCD element is accumulated as follows:

$$\text{Signal} = \text{Incident light} \times \text{Quantum efficiency} \times \text{Integration time}$$

The greater the relative intensity of the incident light coming from the intensifier, the greater the signal stored in the corresponding region of the CCD element.

With the system shown in FIGS. 5&6, only the CCD sensor is cooled. This is sufficient for most purposes. It is to be appreciated however, that the intensifier photocathode could also be cooled, thereby improving the signal to noise ratio of the intensifier. Similarly, the entire photosensitive apparatus (intensifier+CCD) can be cooled. However, cooling the entire photosensitive apparatus has the disadvantage that the efficiency of the phosphor on the fibre optic output window is decreased.

The CCD camera of the present invention uses an asynchronous reset which takes an external drive signal from the computer. As the CCD camera incorporates mechanisms that provide very low lag, short integration periods (e.g. 1/100 second) can be used. If desired, these integration periods can be locked to a gated power supply in the image intensifier, with the result that the camera can be read out at very short intervals. Using the gating and fast readout feature, and with the intensifier run at highest gain or with a multistage intensifier, the present invention can thereby be operated as a conventional photon counting camera. Thus, the present system can advantageously be used for both direct imaging of faint specimens, or as a photon counting camera by changing its mode of operation from integration to gating.

Figure 7:
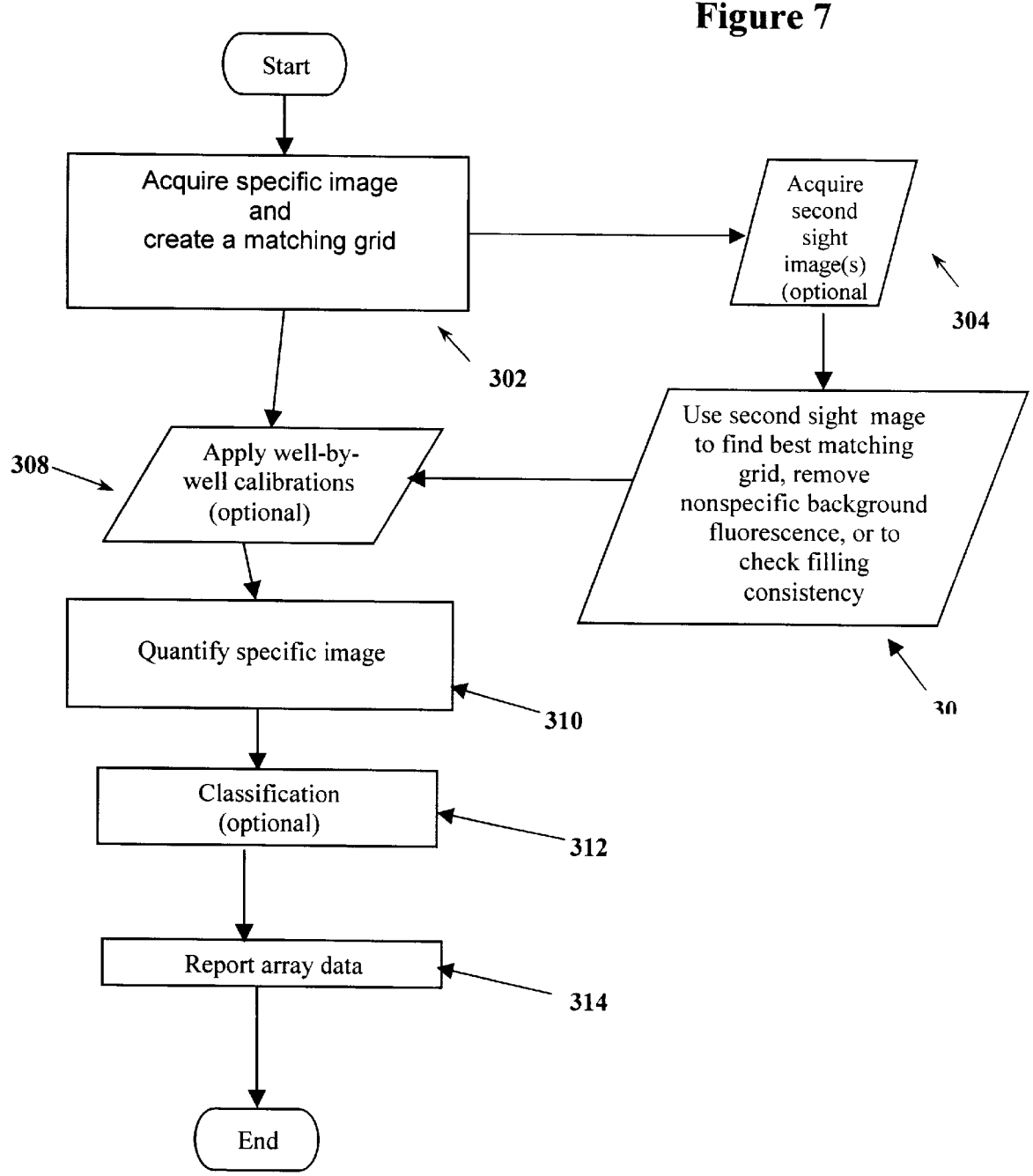
FIG. 7 is a flow chart illustrating the main data analysis process.

FIG. 7 is a flow chart illustrating the main data analysis process performed by computer 28 in controlling the system 1 and acquiring data therefrom. After initiation of the process, a specimen is acquired for analysis at block 302 as described more fully below. In creating this image, the specimen is illuminated and acquired in such a way as to demonstrate maximally the effect of interest. This image is referred to as the specific image. It is to be appreciated that in the specific image, and in any other images acquired by system 1, there are many routine operations for removing errors (e.g. offset and bias in the CCD) in the digital imaging system. These routine options will not be shown here.

A grid consists of an array of probe templates. The "probe template" is the nominal definition of a single target (e.g. in terms of shape and area) corresponding to one dot on a membrane, one well in a plate or similar target. Typically the probe template is a circular area, and there is one probe template for each target in the specimen. A matching grid for a specimen image has all its probe templates matched to the targets on the specimen image (whether they are visible or not). This matching grid is also created at block 302, through a process described more fully below.

The system may simply analyze the specific image. optionally, at block 304, an image of the specimen is acquired under conditions that show best the exact well locations (typically illuminated with white light), and/or conditions that show best filling in the discrete wells, while being minimally affected by the reaction of interest. These images, which are used to improve the quality of data obtained from a specific image, are termed "second sight" images.

A white light image might be used to create a grid that matches well to the specimen. Basically, the location of each well must be established so that data can be extracted from it. Small errors superposition errors between the well and sampling aperture could prove serious. The above-described alignment procedure could be used if there are reasonably good intensities from the specimen. If not, the plate itself is used as a reference, by capturing an image of the plate under dim light. This image shows where all the wells are, and this positioning information can be used to guide data extraction.

Another form of second sight image is used to correct for variation in filling. That is, sample dispensing systems do not place the same amount of sample into each well. In some cases the dispensing error leads to large and irrelevant variations in observed intensities. To remove this error, a second fluor is dispensed. The intensity of the first fluor is related to the reaction of interest. The intensity of the second fluor is not related to the reaction of interest. Rather, its intensity should be the same from well to well. Variations in second fluor intensity can be used to correct out variations in dispensing.

At block 306, the second sight image is used to find the best matching grid, remove nonspecific background fluorescence, or to check filling consistency.

Figure 10:
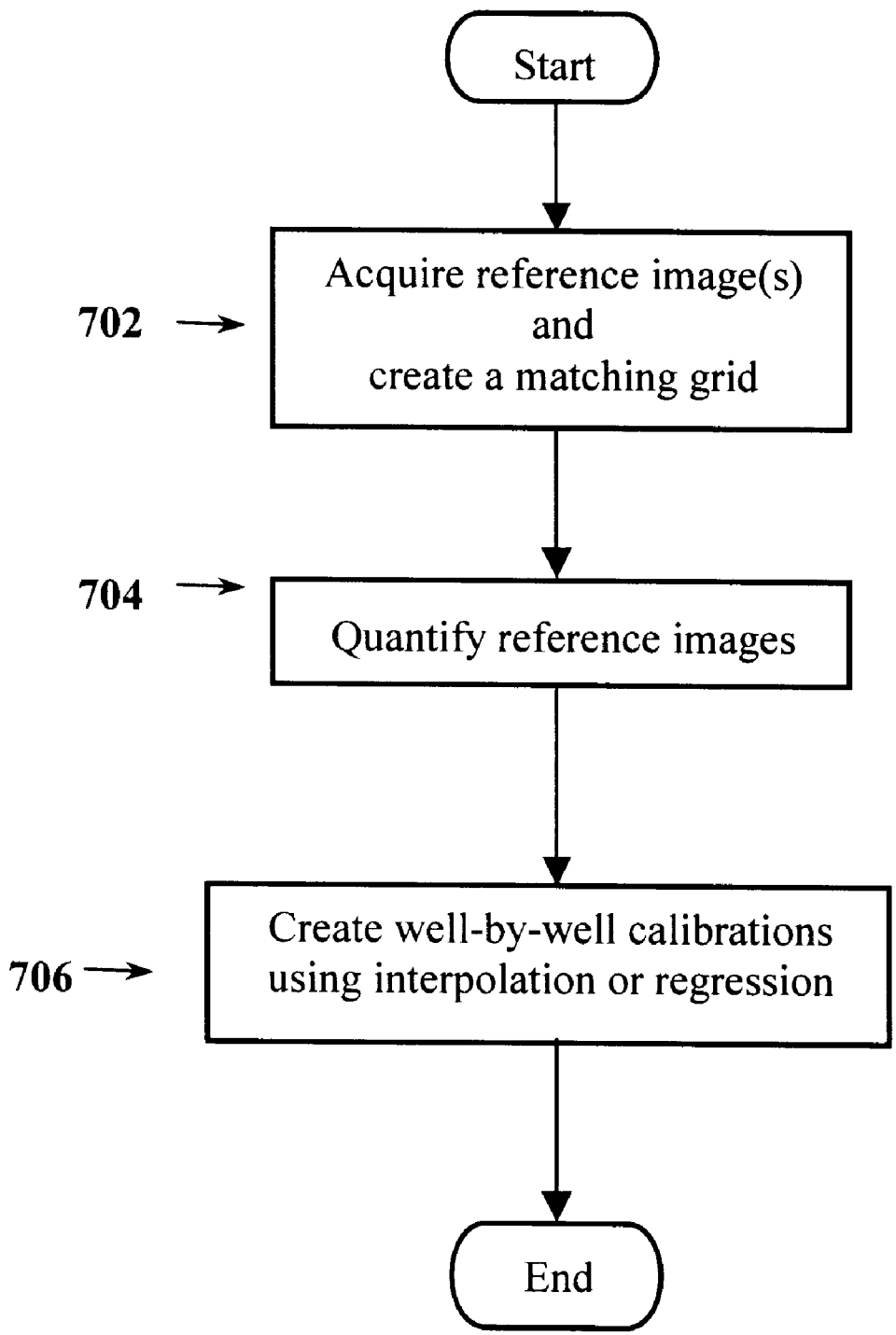
FIG. 10 illustrates a process for establishing well-by-well calibrations for measured efficacy.

At block 308, an optional process is applied to correct for variations in measurement efficiency. This process, well-by-well calibration, can be used to correct measurements from uneven illumination and/or the collection efficiencies. Well-by-well calibration can also be used to measure directly the target substance concentration. The well-by-well calibration establishment is illustrated in FIG. 10. A second sight image, if available, can provide a confidence factor for each target.

At block 310, the system aligns the sampling grid to the specimen, measures all the targets in the specimen, and makes the data available.

At block 312, the measurements taken from each discrete target in the specimen array are decoded to different conditions. For example, a discrete target may be capable of assuming any of n conditions, and the process of block 312 could decode the sample at each probe to one of those conditions. The actual process is performed using a simple intensity criterion (e.g. target X is brighter than 100 and is placed in category 1. At the user's discretion, decoding of targets to conditions applies the process of statistical segmentation. In accordance with this process at block 312, the actual levels at every target within the specimen array are measured. A mean and standard deviation are determined for the set of samples, and this results in a working statistical distribution. Each discrete target could then be decoded to a category, by using its position within the distribution of all targets. Typically, this decoding is based upon the target lying a calculated number of standard deviations from the mean. For example, a target that lies more than 5 standard deviation units from the mean might be decoded to category 1.

At block 314, a process is performed to generate a report of the array data, based upon the process performed at block 312. It is contemplated that this may be any form of report writing software which provides the operator a substantial amount of flexibility in preparing reports of a desired format. Once the reports are generated, the data analysis process ends.

Figure 8:
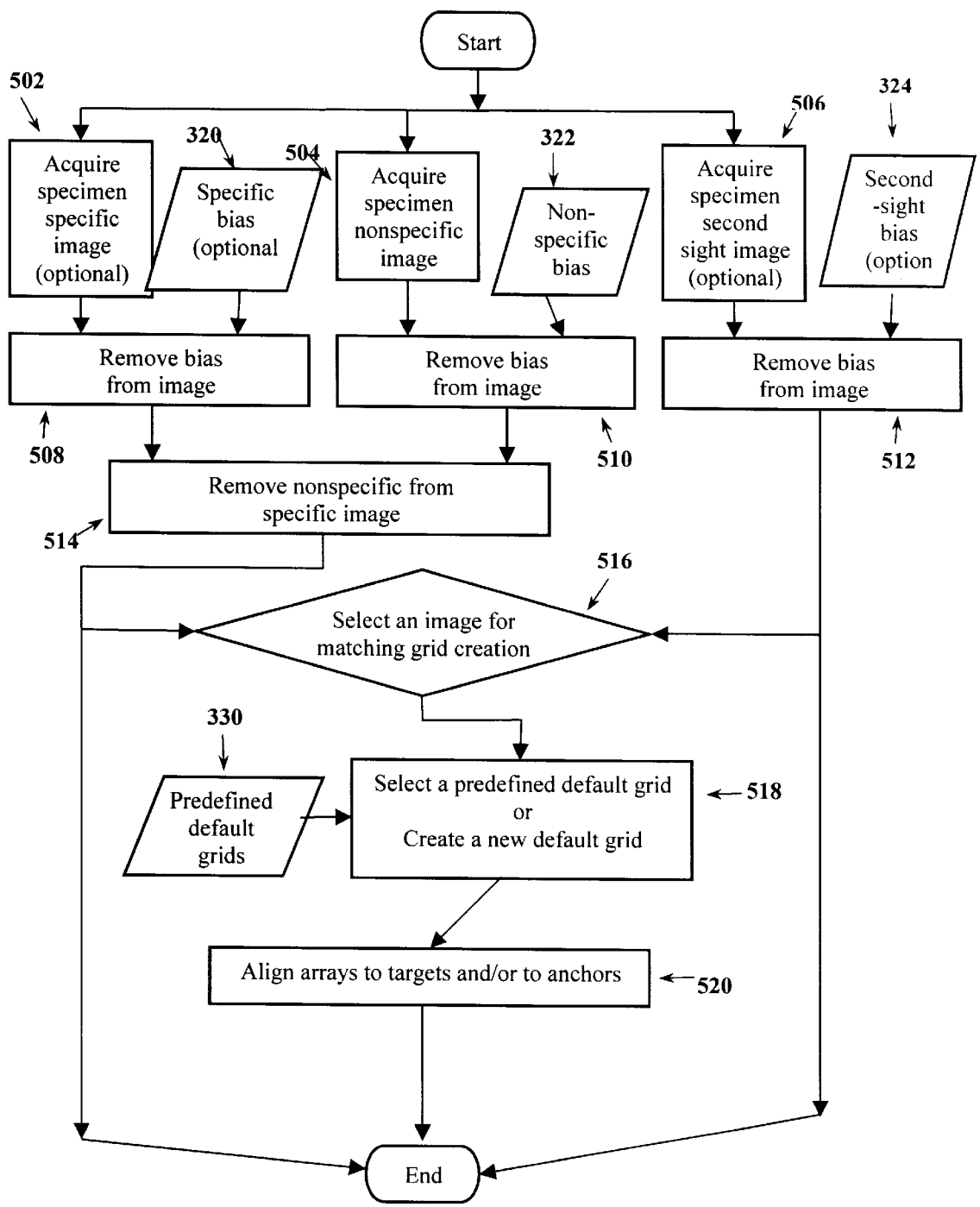
FIG. 8 is a flow chart showing the process grid definition and alignment.

FIG. 8 is a flow chart illustrating the process performed for image acquisition and in aligning sampling grids to target arrays.

After initiation of the process, a specific image is acquired. Known processes exist for acquiring bias images of a specimen. Such bias images take into account all significant distortions and errors introduced by the system itself when an image is taken. At blocks 320, 322 and 324 the bias images for the specific, nonspecific and second sight images are acquired. These bias images are acquired by utilizing one of the known methods. Once the bias images are acquired, they are stored and used from then on, unless the system environment changes as a result of a light bulb replacement, etc.

At block 502, the specimen specific image is acquired and the bias image is removed at block 508.

At block 504, the specimen nonspecific image is acquired. This image determines the contribution of non-specimen components, such as the support substrate, to the image. This step is indicated as optional, since it would only be performed in the event that the specimen had to be illuminated in order to acquire the specimen image, in which event some light would also be reflected from non-specimen elements. On the other hand, if the specimen were the source of the light for the image (as in chemiluminescence), the non-specific image would not be acquired. The nonspecific bias image is removed at block 510.

At the block 506, the specimen second sight image is acquired and the bias images are removed at block 512. This yields the second sight image referred to in block 304.

If the specimen nonspecific image is available, it is removed from the specimen specific image at block 514. This yields the specific image referred to in block 302.

At the block 516, if the second sight image is not available, the specific image is used to create the matching grid. If the second sight image is available and has been acquired for grid alignment, the second sight image will be chosen. Otherwise, the selection can be done based on some known criteria, or the selection can be simply done by examining the images.

At the block 518, the system can automatically select one of a plurality of predefined default grids (330) utilizing known criteria, or a user can manually create a new default grid. The "default grid" represents a grid containing an array of probe templates with uniform row and column spacing.

At block 520 a grid alignment process, discussed more fully below, is performed to align all the probe templates to the corresponding targets. The probe templates can be aligned to their corresponding targets by directly aligning each template to its targets if the most of the targets contain detectable signals or a second sight image is used. Otherwise, the operator can define an array of "anchor points", which will aid the system in locating the probe template positions. It will be appreciated that, in some instances, it may be desirable to align the array using both methods.

At the end of this process, a specimen specific image, a matching grid and a second sight image (optional) have been generated.

The target or anchor alignment processes are essentially the same. In the case of anchor alignment, once the anchors are aligned, the system uses a known regression method to align the rest of probe templates to the aligned anchor points.

Figure 9:
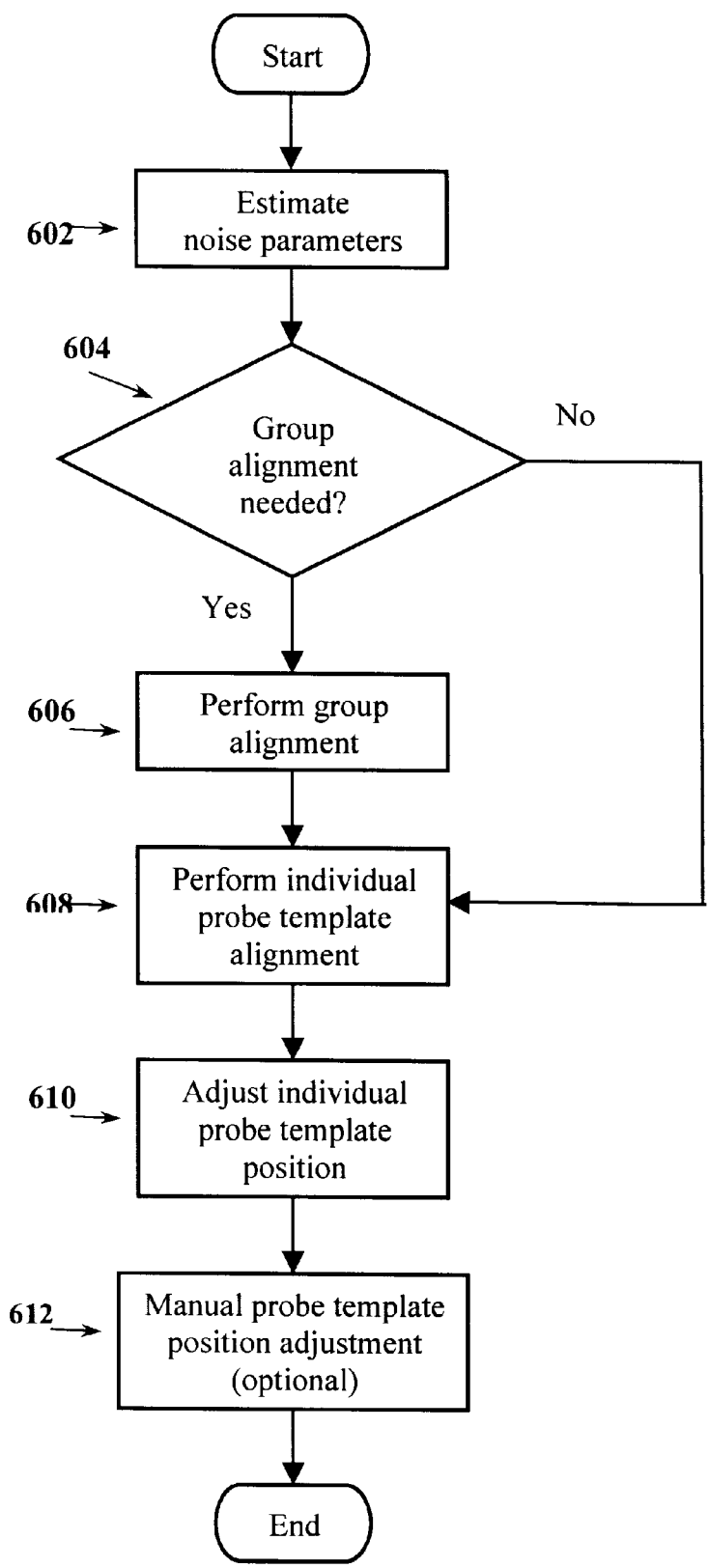
FIG. 9 is a flow chart illustrating the well-by-well calibration process.

FIG. 9 is a flow chart illustrating the process performed in block 520 of FIG. 8.

After initiation of the process, image background and noise are estimated at block 602. At block 604, a determination is made whether a group alignment of the grid to the array of targets is necessary. This could be done either visually by an operator or by the system. The purpose of this test is to determine whether the grid is aligned to the targets overall. If done by the system, it would be performed by a conventional procedure for testing alignment of two regular patterns or shapes. If it is determined that adequate alignment of the group exists, control is transferred to block 608.

At block 606, a group alignment is performed. The purpose of this operation is to align the probe template grid roughly with the respective targets. The alignment may be done on the basis of the whole grid or part of the grid selected by the operator. This alignment could be done by the process discussed below with respect to block 608 for maximizing CS, except that CS is maximized over the entire grid.

At block 608, a step-wise process is performed within the area of each individual probe template to locate that point which yields a maximum confidence score (CS), within the probe template as determined by equation (1):

$$CS(x0, y0) = (1-a)N_f \int_{S(x0,y0)} D(x,y)W(x-x0, y-y0)dxdy + a\frac{\int_{S(x0,y0)} D[(x,y)-\overline{D}][W(x-x0, y-y0)-\overline{W}]dxdy}{\sqrt{\int_{S(x0,y0)}[D(x,y)-\overline{D}]^2 dxdy \int_{S(0,0)}[W(x,y)-\overline{W}]^2 dxdy}} \quad (1)$$

where: 
$a$ is a weighting (shape) factor in the range of $[0, 1]$;
$N_f$ is a normalization function, converting a value in the range of $(-\infty, +\infty)$ to a new value in the range of $[0, 1]$;
$(x0, y0)$ is the center point of a probe template;
$S(x0, y0)$ is the probe template area at $(x0, y0)$;
$D(x, y)$ is the density value (e.g. brightness) at $(x, y)$; and
$W(x, y)$ is a weighting function (e.g. a two-dimensional Gaussian function with its maximum value at $(0, 0)$).
$\overline{D}$ is the average value of density within $S(xo, yo)$.
$\overline{W}$ is the average value of the weight function The first term in equation (1) represents a score for the pixel density values within a discrete target, whereas the second term represents a score for density profile matching. The density profile will match its expected shape closely as noise decreases, so the second term is very sensitive to the presence of noise and other artifacts within the specimen contained in the probe template.

The first and second terms of equation (1) are added in weighted fashion based on the weighting factor, a, which is a shape weighting factor. Preferably, the weighting factor is set by the system on the basis of estimated noise parameters. Alternatively, the weighting factor may have a default value and can be adjusted downward by the operator in the event that the process of FIG. 9 does not yield good results.

Equation (1) yields an "A location" for each probe template, which is that location that provides the maximum value in equation (1). The probe template location prior to block 608 will be referred to as the "G location."

At block 610, a comparison is performed between the A location and G location, in order to arrive at the final location of the center of each probe template. In effect the weighting factors are utilized to determine the position of the probe center along a path between the A and G locations, with weighting determining how close the point is to the A location. Preferably, this done in a step-wise fashion by moving from location G to the location having the highest value for equation (1), only if that value exceeds a predetermined threshold confidence criterion, such as exceeding the value of equation (1) at the G location by a predetermined amount or proportion. As the threshold criterion is increased, movement from location G becomes less likely.

FIG. 10 illustrates the process of block 308 for establishing well-by-well calibrations for measurement efficiency. At block 702, the system acquires a set of reference plates to be used for the calibration. The processes of imaging reference plates, and of aligning sampling grids to the reference plates are as shown in FIGS. 7–9.

Each well in a reference plate is filled with the same or a known concentration of a substance. Each plate in the set of reference plates has a different concentration of the substance. Typically, the substance will have fluorescence or luminance characteristics similar to those of the substance used to label the reaction of interest.

At block 704, numerical data are obtained for the gray level value of each well, in each reference plate. As a result of block 704, computer 28 has a set of data pairs (gray level value and concentration value for each reference plate) for each well. For example, well #1 yields a gray level value of 100 in reference plate 1 with concentration 10, of 200 in reference plate 2 with concentration 20, etc.

At block 706, the calibration for each well is created by fitting a regression, interpolation or other function to the data pairs associated with that well. As a result, each and every well position is calibrated to the relation between observed gray level value, and concentration in a well plate. This calibration may then be used in classifying and reporting data as shown in blocks 312—312 of FIG. 7.

Although the detailed description describes and illustrates preferred embodiments of the present invention, the invention is not so limited. Modifications and variations will be apparent to persons skilled in this art which do not depart from the scope and spirit of the invention as defined by the appended claims.

What is claimed is:

1. A method for use in a digital imaging system for assays to extract targets on a specimen containing an array of targets that may not be arranged in perfect regularity, said method comprising the steps of:

defining a matrix of nominal target locations including a probe template of predefined, two-dimensional size and shape at each of a plurality of fixed, predefined grid points on the specimen; and determining the most probable location of the probe template corresponding to a specific target by sensing both pixel intensity and the spatial distribution of pixel intensities in an image of the specimen at a plurality of locations in the vicinity of a nominal target location.

2. The method of claim 1, further comprising the step of, using a confidence value indicative of reliability of the most probable location as a weighting factor, shifting the location of the probe template from the nominal target location towards the most probable location for the selected target.

3. The method of claim 2, wherein said determining step is performed iteratively for each target.

4. A method for use in a digital imaging system for assays to extract targets on a specimen containing an array of targets that may not be arranged in perfect regularity, said method comprising the steps of:

defining a matrix of nominal target locations including a probe template of predefined, two-dimensional size and shape at each of a plurality of fixed, predefined grid points on the specimen;

determining the most probable location of the probe template corresponding to a specific target by sensing both pixel intensity and the spatial distribution of pixel intensities in an image of the specimen at a plurality of locations in the vicinity of a nominal target location;

using a confidence value indicative of reliability of the most probable location as a weighting factor, shifting the location of the probe template from the nominal target location towards the most probable location for the selected target; and wherein said determining step determines the confidence score, $CS(x0,y0)$, at said plurality of locations, defined by the following formula:

$$CS(x0, y0) = (1-a) N_f \int_{S(x0,y0)} D(x,y) W(x-x0, y-y0) dx\, dy + a \frac{\int_{S(x0,y0)} D[(x,y) - \overline{D}][W(x-x0, y-y0) - \overline{W}] dx\, dy}{\sqrt{\int_{S(x0,y0)} [D(x,y) - \overline{D}]^2 dx\, dy \int_{S(0,0)} [W(x,y) - \overline{W}]^2 dx\, dy}}$$

where: $a$ is a weighting factor in the range of [0, 1];

$N_f$ is a normalization function, converting a value in the range of $(-\infty, +\infty)$ to a new value in the range of [0, 1];

$(x0, y0)$ is the center point of a probe template;

$S(x0, y0)$ is the probe template area at $(x0, y0)$;

$D(x, y)$ is the density value (e.g. brightness) at $(x, y)$; and $W(x, y)$ is a weighting function (e.g. a two-dimensional Gaussian function with its maximum value at $(0, 0)$).

$\overline{D}$ is the average value of density within $S(x0, y0)$.

$\overline{W}$ is the average value of the weight function.

the most probable location being the one which maximizes the formula.

5. The method of claim 4, wherein the image used in said defining step is produced by generating a primary image of the specimen showing to best advantage the effect of interest, generating a secondary image which shows minimally the effect of interest but which shows at least one of a second effect and the location of wells.

6. A method for use in a digital imaging system for assays to extract targets on a specimen containing an array of targets that may not be arranged in perfect regularity, said method comprising the steps of:

defining a matrix of nominal target locations including a probe template of predefined, two-dimensional size and shape at each of a plurality of fixed, predefined grid points on the specimen;

determining the most probable location of the probe template corresponding to a specific target by sensing both pixel intensity and the spatial distribution of pixel intensities in an image of the specimen at a plurality of locations in the vicinity of a nominal target location; and wherein said determining step determines the confidence score, $CS(x0,y0)$, at said plurality of locations, defined by the following formula:

$$CS(x0, y0) = (1-a)N_f \int_{S(x0,y0)} D(x, y)W(x - x0, y - y0)dxdy +$$

$$a \frac{\int_{S(x0,y0)} D[(x, y) - \overline{D}][W(x - x0, y - y0) - \overline{W}]dxdy}{\sqrt{\int_{S(x0,y0)} [D(x, y) - \overline{D}]^2 dxdy \int_{S(0,0)} [W(x, y) - \overline{W}]^2 dxdy}}$$

where: 
- $a$ is a weighting factor in the range of [0, 1];
- $N_f$ is a normalization function, converting a value in the range of $(-\infty, +\infty)$ to a new value in the range of [0, 1];
- $(x0, y0)$ is the center point of a probe template;
- $S(x0, y0)$ is the probe template area at $(x0, y0)$;
- $D(x, y)$ is the density value (e.g. brightness) at $(x, y)$; and
- $W(x, y)$ is a weighting function (e.g. a two-dimensional Gaussian function with its maximum value at $(0, 0)$).
- $\overline{D}$ is the average value of density within $S(x0, y0)$.
- $\overline{W}$ is the average value of the weight function.

the most probable location being the one which maximizes the formula.

7. The method of claim 6, wherein the image used in said deriving step is produced by generating a primary image of the specimen showing to best advantage the effect of interest, generating a secondary image which shows minimally the effect of interest and combining the secondary image with the primary image.

8. The method of claim 1, wherein said determining step is performed iteratively for each target.

9. The method of claim 8, wherein the image used in said deriving step is produced by generating a primary image of the specimen showing to best advantage the effect of interest, generating a secondary image which shows minimally the effect of interest and combining the secondary image with the primary image.

10. The method of any one of claim 1, wherein the specimen is provided with predefined anchor points, the matrix being initially aligned to the actual target locations in the specimen by placing specific probe templates over one of: the anchor points; and those target points which contain detectable signals.

11. The method of claim 2, wherein the confidence value for a target is determined by the detectability of the target.

12. The method of claim 4 further comprising the step of shifting the location of the probe template from the nominal target location towards the most probable location for the selected target only when the confidence value exceeds a predefined threshold value.

13. In a digital imaging system for assays, an apparatus for extracting targets on a specimen containing an array of targets that may not be arranged in perfect regularity, comprising:

a grid generator providing a matrix of nominal target locations including a probe template of predefined, two-dimensional size and shape at each of a plurality of fixed, predefined grid points on the specimen; and a probe template locator, jointly responsive to pixel intensity and the spatial distribution of pixel intensities in an image of the specimen at a plurality of locations in the vicinity of a nominal target location, to determine the most probable location of the probe template corresponding to a specific target.

14. The apparatus of claim 13, further comprising a shifter, responsive to a confidence signal related to the reliability of the most probable location, to shift the location of the probe template from the nominal target location towards the most probable location for the selected target.

15. In a digital imaging system for assays, an apparatus for extracting targets on a specimen containing an array of targets that may not be arranged in perfect regularity, comprising:

a grid generator providing a matrix of nominal target locations including a probe template of predefined, two-dimensional size and shape at each of a plurality of fixed, predefined grid points on the specimen; and a probe template locator, jointly responsive to pixel intensity and the spatial distribution of pixel intensities in an image of the specimen at a plurality of locations in the vicinity of a nominal target location, to determine the most probable location of the probe template corresponding to a specific target;

a shifter, responsive to a confidence signal related to the reliability of the most probable location, to shift the location of the probe template from the nominal target location towards the most probable location for the selected target; and wherein said probe template locator comprises a processor determining the integrated density, ID(x0,y0), at each of said plurality of locations, in accordance with the following formula:

$$ID(x0, y0) = aN_f \int_{S(x0,y0)} D(x, y)W(x - x0, y - y0)dxdy +$$

$$(1-a) \frac{\int_{S(x0,y0)} D[(x, y) - \overline{D}][W(x - x0, y - y0) - \overline{W}]dxdy}{\sqrt{\int_{S(x0,y0)} [D(x, y) - \overline{D}]^2 dxdy \int_{S(0,0)} [W(x, y) - \overline{W}]^2 dxdy}}$$

-continued where:
- $a$ is a weighting factor in the range of $[0, 1]$;
- $N_f$ is a normalization function, converting a value in the range of $(-\infty, +\infty)$ to a new value in the range of $[0, 1]$;
- $(x0, y0)$ is the center point of a probe template;
- $S(x0, y0)$ is the probe template area at $(x0, y0)$;
- $D(x, y)$ is the density value (e.g. brightness) at $(x, y)$; and
- $W(x, y)$ is a weighting function (e.g. a two-dimensional Gaussian function with its maximum value at $(0, 0)$).
- $\overline{D}$ is the average value of density within a valid weight function range.
- $\overline{W}$ is the average value of the weight function.

the processor selecting as the most probable location the one which maximizes the formula.

16. The method of claim 2, wherein the specimen is provided with predefined anchor points, the matrix being initially aligned to the actual target locations in the specimen by placing specific probe templates over one of: the anchor points; and those target points which contain detectable signals.

17. The method of claim 3, wherein the specimen is provided with predefined anchor points, the matrix being initially aligned to the actual target locations in the specimen by placing specific probe templates over one of: the anchor points; and those target points which contain detectable signals.

18. The method of claim 4, wherein the specimen is provided with predefined anchor points, the matrix being initially aligned to the actual target locations in the specimen by placing specific probe templates over one of: the anchor points; and those target points which contain detectable signals.

19. The method of claim 6 further comprising the step of shifting the location of the probe template from the nominal target location towards the most probable location for the selected target only when the confidence value exceeds a predefined threshold value.

20. In a digital imaging system for assays, an apparatus for extracting targets on a specimen containing an array of targets that may not be arranged in perfect regularity, comprising:

a grid generator providing a matrix of nominal target locations including a probe template of predefined, two-dimensional size and shape at each of a plurality of fixed, predefined grid points on the specimen; and a probe template locator, jointly responsive to pixel intensity and the spatial distribution of pixel intensities in an image of the specimen at a plurality of locations in the vicinity of a nominal target location, to determine the most probable location of the probe template corresponding to a specific target;

said probe template locator comprising a processor determining the integrated density, $ID(x0,y0)$, at each of said plurality of locations, in accordance with the following formula:

$$ID(x0, y0) = aN_f \int_{S(x0,y0)} D(x, y)W(x - x0, y - y0)dxdy + (1-a)\frac{\int_{S(x0,y0)} D[(x, y) - \overline{D}][W(x - x0, y - y0) - \overline{W}]dxdy}{\sqrt{\int_{S(x0,y0)}[D(x, y) - \overline{D}]^2 dxdy \int_{S(0,0)}[W(x, y) - \overline{W}]^2 dxdy}}$$

where:
- $a$ is a weighting factor in the range of $[0, 1]$;
- $N_f$ is a normalization function, converting a value in the range of $(-\infty, +\infty)$ to a new value in the range of $[0, 1]$;
- $(x0, y0)$ is the center point of a probe template;
- $S(x0, y0)$ is the probe template area at $(x0, y0)$;
- $D(x, y)$ is the density value (e.g. brightness) at $(x, y)$; and
- $W(x, y)$ is a weighting function (e.g. a two-dimensional Gaussian function with its maximum value at $(0, 0)$).
- $\overline{D}$ is the average value of density within a valid weight function range.
- $\overline{W}$ is the average value of the weight function.

the processor selecting as the most probable location the one which maximizes the formula.

* * * * *